(12) United States Patent
Gray et al.

(10) Patent No.: US 8,239,178 B2
(45) Date of Patent: Aug. 7, 2012

(54) SYSTEM AND METHOD OF MODELING AND MONITORING AN ENERGY LOAD

(75) Inventors: Anthony R. Gray, Victoria (CA); Shaun Hope, Alameda (CA)

(73) Assignee: Schneider Electric USA, Inc., Palatine, IL (US)

( * ) Notice: Subject to any disclaimer, the term of this patent is extended or adjusted under 35 U.S.C. 154(b) by 525 days.

(21) Appl. No.: 12/561,024

(22) Filed: Sep. 16, 2009

(65) Prior Publication Data

US 2011/0066299 A1   Mar. 17, 2011

(51) Int. Cl.
*G06F 7/60*   (2006.01)
*G06F 17/10*   (2006.01)
*G05D 17/00*   (2006.01)

(52) U.S. Cl. .......................................... 703/2; 700/291
(58) Field of Classification Search ....... 703/2; 700/291
See application file for complete search history.

(56) References Cited

U.S. PATENT DOCUMENTS

| | | | |
|---|---|---|---|
| 6,757,591 B2* | 6/2004 | Kramer | 700/288 |
| 8,000,911 B2* | 8/2011 | Carter et al. | 702/60 |
| 8,027,795 B2* | 9/2011 | Van Gorp et al. | 702/60 |
| 2007/0239317 A1* | 10/2007 | Bogolea et al. | 700/276 |

* cited by examiner

*Primary Examiner* — Dwin M Craig
*Assistant Examiner* — Aniss Chad
(74) *Attorney, Agent, or Firm* — Nixon Peabody LLP

(57) ABSTRACT

A system, method, and computer program product for predicting operation for physical systems with distinct operating modes uses observable qualities of the system to predict other qualities of the system. Independent variables including temperature or production volume are observed to determine the degree to which a dependent modeled variable, including energy load, is influenced. Partition variables representing operating conditions of the dependent variables are defined as discrete values. Reference datasets with coincident values of the dependent variable, independent variable, and partition variables are received, and models are created for each discrete value of the partition variables in the reference dataset. Each model is populated with the values of the dependent variable and the independent variable. The dependent variable is modeled as a function of the independent variable. Model accuracy is evaluated by processing new input data to generate output data that includes values of the coincident dependent variable, the independent variable, and the partition variable from the input dataset.

20 Claims, 7 Drawing Sheets

SYSTEM AND METHOD OF MODELING AND MONITORING AN ENERGY LOAD

FIELD OF THE INVENTION

The present invention relates generally to modeling and monitoring physical systems and in particular to creating and selecting models for systems with distinct operating modes.

BACKGROUND OF THE INVENTION

Physical systems, such as an electrical utility system or a heating, ventilation, and air conditioning (HVAC) system, may be monitored by a network of intelligent electronic devices ("IEDs") coupled to a computer and/or server for monitoring various parameters or characteristics of the physical system. In addition to monitoring these systems, the physical systems may be modeled mathematically in a number of ways. Generally, the models take one or more observable qualities of the physical system that can be measured or observed and predict a numerical characterization of some other quality of the system that is thought to be causally influenced by the observed qualities. The observable qualities of the physical system that can be measured or observed are referred to as "driver variables," or "independent variables." The quality of the system that is thought to be causally influenced by the driver variables is called the "modeled variable," or "dependent variable."

One approach to modeling a physical system is by the use of a linear regression model, which computes a predicted quantity as a linear combination of scaled input quantities. However, some physical systems may have regimes of linear or piecewise linear behaviour each of which can be modeled well separately, but for which no single model will work for all of the regimes of applicability. The physical system may be modeled well using a linear model or a piecewise linear model with driver variables for each mode separately, but no single model can be constructed that works well for all modes.

Thus, a need exists for an improved system and method of modeling physical systems. The present invention is directed to satisfying one or more of these needs and solving other problems.

SUMMARY OF THE INVENTION

The present invention includes a system, method, and computer program product that provides flexible and accurate predictions of physical system behaviors for systems with distinct operating modes. The systems and methods of the present invention model physical systems with distinct operating modes. An example of these types of systems includes complex systems under computer control, such as energy load monitoring and management systems, complex industrial systems, heating, ventilation, and air conditioning (HVAC) systems, production line systems, and other systems where energy is consumed.

Energy consumption may be a cost driver in these types of physical systems. The more efficiently a producer of goods is able to monitor and manage energy consumption and energy costs, the lower the overall cost of producing the good. The systems, methods, and computer program products of the present invention accurately and efficiently monitor and manage energy consumption using computer models. The energy load may include measurements of a utility service quantity, such as an electrical utility service, a gas utility service, a water utility service, an air utility service, a steam utility service, and the like.

For example, a computer-implemented method of modeling and monitoring an energy load in accordance with the present invention includes using a load monitoring server to define an influencing driver that affects operation of a system's energy load. The influencing driver is akin to an independent variable that affects system operation. In one system, the influencing driver may be outdoor temperature, for example. The outdoor temperature affects system operation of an HVAC system. Likewise, a computer-implemented method of modeling and monitoring an energy load includes defining an operation of the energy load with the load monitoring server. The operation of the energy load may be a dependent variable, such as "kilowatts" in the HVAC system example. The monitoring and modeling system may then be used to determine the effect that outdoor temperature has on the number of kilowatts used in the HVAC system. Additionally, the modeling and monitoring method uses the load monitoring server to define partition variables that represent operating conditions of the energy load as discrete values. Continuing with the HVAC system example, the partition variables may be defined as discrete values such as "Occupied" and "Unoccupied," reflecting two operating conditions of the HVAC system, based on the occupancy level of a building Once the variables are defined, the computer-implemented method for modeling and monitoring an energy load receives a reference dataset at the load monitoring server. The reference dataset includes coincident values of the dependent variable, independent variable, and partition variables. In the HVAC system example, the reference dataset includes values of the outdoor temperature, the kilowatts used, and the occupancy status of the building at a number of times during a day. The modeling and monitoring system and method then creates a model for each discrete value of the partition variables in the reference dataset with the load monitoring server. The models represent operation of the energy load of the system.

After the models are created for each discrete value of the partition variable, each model is populated with the values of the independent variable (outdoor temperature) and the dependent variable (kilowatts) coincident with the discrete value of the partition variable (occupied or unoccupied) corresponding to the created model, such that the dependent variable is modeled as a function of the independent variable. The models may be created and populated at the same time by the same party, or the models may be created in a modular fashion, where one party may collect and organize the data that makes up the input dataset, and another party may create the models to operate upon the dataset. Similarly, additional parties may provide additional coincident data or variables. When the models are created and the variables are mapped, the modeling and monitoring system may evaluate the accuracy of the model by plugging in a new set of input data. Input data may be received at the load monitoring server. The input data may include hypothetical measurements, estimated measurements, and the like. The input data set may include additional coincident values of the independent variable (outdoor temperature) and the partition variable (occupied or unoccupied). The system of the present invention may then process the additional coincident values of the independent variable (outdoor temperature) and the partition variable (occupied or unoccupied) with the created models and generate an output dataset with the load monitoring server from the created models. The output dataset includes coincident values of the predicted dependent variable (kilowatts). The output dataset may further include coincident values of the independent variable and the partition variable from the input dataset. The input and output datasets may then be displayed to a user on a computer display or stored on a computer readable storage media, or otherwise examined further. The output dataset may then be used to make adjustments to the energy load system and to take action to further dictate the operating behavior of the energy load system.

In the system and method of the present invention, it is possible to use more than one partition variable in the creation of models. Just as a model may be created for each discrete value of a single partition variable, a model may be created for each discrete value of each partition variable. For example, consider two partition variables: Occupancy (with values "occupied" and "unoccupied" and HVAC Mode (with values "normal" and "maintenance"). A model may be created for each possible combination of these two partition variables (four models in total).

Additionally, with the system and method of the present invention it is also possible to create models with more than one independent variable. If a simple linear model for a single independent variable has the form $y=mx+b$, for example, a linear model with multiple independent variables would have the form $y=m_1x+m_2z+\ldots+b$.

In a monitoring operation, the reference data may be used to show how the energy load is operating currently by taking real-time measurements of the dependent variable (kilowatts) and comparing the real-time measurement to a modeled dependent variable (kilowatts) to evaluate any differences between the real and modeled readings.

One approach of the present invention to modeling a physical system is by the use of a linear regression model, which computes predicted quantities as linear combinations of scaled input quantities. The model takes measured or observable qualities of a physical system and predicts the numerical characterization of some other quality of the system that is causally influenced by the observed qualities. As above, the observable qualities of the physical system that can be measured or observed are referred to as "independent variables." The quality of the system that is thought to be causally influenced by the driver variables is called the "dependent variable."

A system and method of modeling and monitoring an energy load in accordance with the present invention may be created empirically, by looking at a reference dataset that captures both the driver and modeled variables for some time period (the reference period) and by then inferring the relationship that best estimates the modeled variable from the driver variables in that dataset.

Linear regression models may provide acceptable estimates for systems that respond in a linear way to their surroundings. But for systems that exhibit nonlinearity in the relationships between the driver data and the modeled variable, no single system model can be constructed that works well for different modes of system operation.

According to some embodiments of the present invention, a system, method, and computer program product includes monitoring a characteristic of a physical system in an external instrument, such as an intelligent electronic device (IED), to produce monitored characteristic values that are buffered in the IED. The IED is communicatively coupled to a monitoring server via a communications network. The monitored characteristic values are indicative of the characteristic of the physical system. The server is used to model and monitor the performance and characteristics of the physical system as described above According to some embodiments of the present invention, a computer-readable storage media for modeling and monitoring an energy load in accordance with the present invention includes one or more computer-readable instructions configured to cause one or more computer processors to execute operations including defining a dependent variable with a load monitoring server, the dependent variable representing an operation of the energy load and defining an independent variable with the load monitoring server, the independent variable representing an influencing driver of the operation of the energy load. The computer-readable storage media also includes instructions configured to cause a processor to execute operations including defining partition variables with the load monitoring server, the partition variables representing operating conditions of the energy load as discrete values and receiving a reference dataset at the load monitoring server, the reference dataset including coincident values of the dependent variable, independent variable, and partition variables. The operations further include creating a model for each discrete value of the partition variables in the reference dataset with the load monitoring server, the model representing operation of the energy load and then populating each created model with the values of the dependent variable and the independent variable coincident with the discrete value of the partition variable corresponding to the created model, such that the dependent variable is modeled as a function of the independent variable. The computer-readable storage media also includes instructions configured to cause a processor to execute operations including receiving an input dataset at the load monitoring server, the input dataset including additional coincident values of the independent variable and the partition variable and processing the additional coincident values of the independent variable and the partition variable with the created models. The computer-readable storage media also includes instructions configured to cause a processor to execute operations including generating an output dataset with the load monitoring server from the created models, the output dataset including predicted dependent variable values coincident with values from the independent variable and the partition variable from the input dataset.

The foregoing and additional aspects and embodiments of the present invention will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

DETAILED DESCRIPTION OF THE ILLUSTRATED EMBODIMENTS

Figure 1:
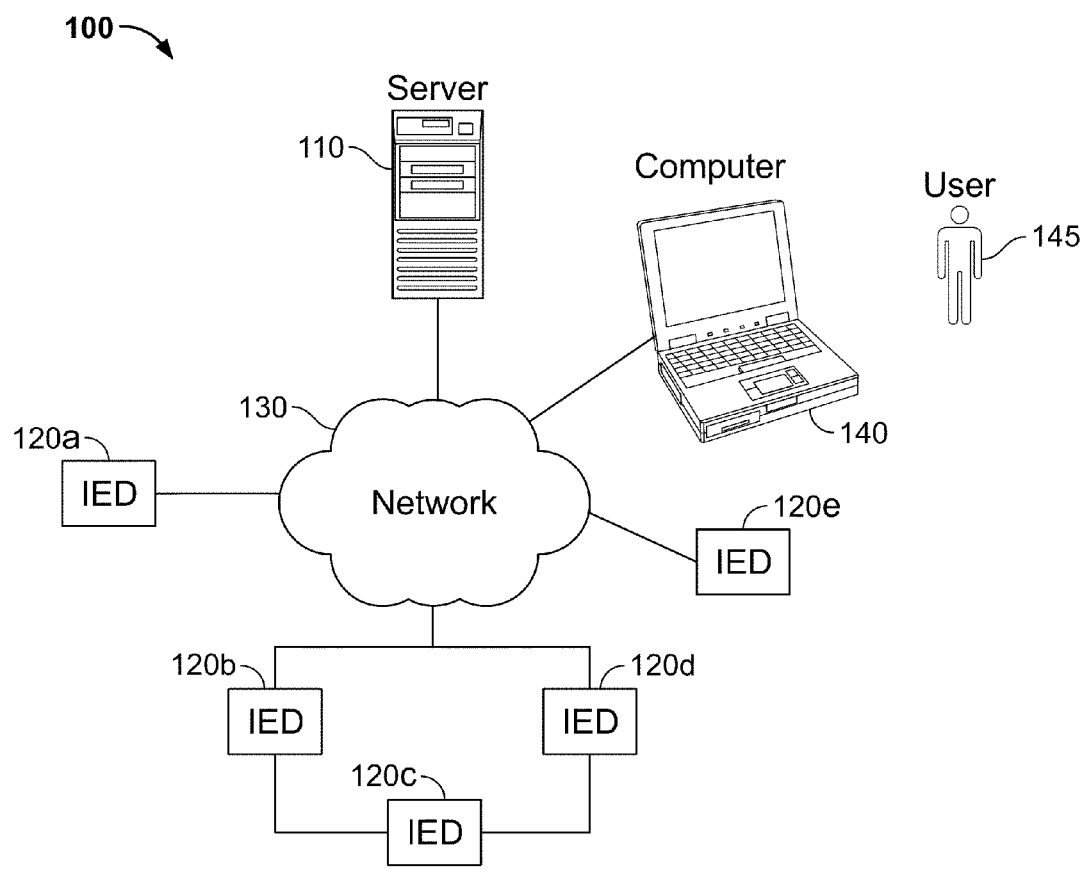
FIG. 1 is a functional block diagram of an energy modeling and monitoring system according to some aspects of the present disclosure.

Although the invention will be described in connection with certain aspects and/or embodiments, it will be understood that the invention is not limited to those particular aspects and/or embodiments. On the contrary, the invention is intended to cover all alternatives, modifications, and equivalent arrangements as may be included within the spirit and scope of the invention as defined by the appended claims.

Unless otherwise noted, or as may be evident from the context of their usage, any terms, abbreviations, acronyms or scientific symbols and notations used herein are to be given their ordinary meaning in the technical discipline to which the invention most nearly pertains. The following terms, abbreviations and acronyms may also used in the description contained herein. A modeled variable is a physical quantity that can be measured or observed and characterized numerically, which is believed to be causally influenced by the driver variables. A driver variable includes any physical quantity that can be measured or observed and characterized numerically. Examples of driver variables include, but are not limited to, indoor and outdoor temperature, humidity, barometric pressure, cloud cover, length of day, building occupancy, product colour, product weight, production activity, manhours worked, and the like. Driver data is a sequence of time-stamped data values representing measurements or observations of a single driver variable. A driver data point is a set of values, one for each driver variable in a model, all of which are valid at the same point in time. Simultaneous values of temperature, pressure, wind speed and building occupancy could form a driver data point for a model which depended on those variables, for example. A model is a mathematical formula that produces an estimate of the modeled variable from a driver data point. A reference dataset is a set of driver data and data for the modeled, dependent variable for some time period or periods (the reference period) which is considered to exemplify "typical" behaviour of the system to be modeled. The reference dataset is analyzed to determine the functional form of the model using linear regression, as one technique. A reference period is the time period or periods covered by the reference dataset. A partition variable is a discrete nominal (categorical) variable which has a definite value for any driver data used to create or evaluate a model. A partition domain is a set of all possible values of the partition variable. A partition function is a discrete valued function of some continuous input variable or variables having a finite range.

According to some embodiments of the present invention, a system, method, and computer program product includes monitoring a characteristic of a physical system in an external instrument, such as an intelligent electronic device (IED), to produce monitored characteristic values that are buffered in the IED. The IED is communicatively coupled to a load monitoring server via a communications network. The monitored characteristic values are indicative of the characteristic of the physical system. The load monitoring server carries out a computer-implemented method of modeling and monitoring an energy load in accordance with the present invention.

The load monitoring server defines an independent variable, representing an influencing driver that affects operation of a system's energy load. The influencing driver is a driver of system behavior and is akin to an independent variable that affects system operation. In one system in accordance with the present invention, the influencing driver may be outdoor temperature, for example. The outdoor temperature affects system operation of an HVAC system. A computer-implemented method of modeling and monitoring an energy load in accordance with the present invention includes defining an operation of the energy load with the load monitoring server. As outlined above, the operation of the energy load may be a dependent variable, such as "kilowatts" in the HVAC system example. The monitoring and modeling system may then be used to determine the effect that outdoor temperature has on the number of kilowatts used in the HVAC system. Additionally, the modeling and monitoring method of the present invention uses the load monitoring server to define partition variables that represent operating conditions of the energy load as discrete values. Continuing with the HVAC system example above, the partition variables may be defined as discrete values such as "Occupied" and "Unoccupied."

Once the variables are defined, the computer-implemented method for modeling and monitoring an energy load of the present invention receives a reference dataset at the load monitoring server. The reference dataset includes coincident values of the dependent variable, independent variable, and partition variables. In the HVAC system example, the reference dataset includes values of the outdoor temperature, the kilowatts used, and the occupancy status of the building at a number of times during a day. The modeling and monitoring system and method then creates a model for each discrete value of the partition variables in the reference dataset with the load monitoring server. The models represent operation of the energy load of the system.

Once the models are created for each discrete value of the partition variable, each model is populated with the values of the independent variable (outdoor temperature) and the dependent variable (kilowatts) coincident with the discrete value of the partition variable (occupied or unoccupied) corresponding to the created model, such that the dependent variable is modeled as a function of the independent variable. As outlined above, the models may be created and populated at the same time by the same party, or the models may be created in a modular fashion, where one party may collect and organize the data that makes up the input dataset, and another party may create the models to operate upon the dataset. Similarly, additional parties may provide additional coincident data or variables to be used in the models.

After the models are created and the variables are mapped, the modeling and monitoring system may evaluate the accuracy of the model by plugging in a new set of input data. Input data may be received at the load monitoring server. The input data set may include additional coincident values of the independent variable (outdoor temperature) and the partition variable (occupied or unoccupied). The system of the present invention may then process the additional coincident values of the independent variable (outdoor temperature) and the partition variable (occupied or unoccupied) with the created models and generate an output dataset with the load monitoring server from the created models. The output dataset includes coincident values of the predicted dependent variable (kilowatts). The output dataset may further include coincident values of the independent variable and the partition variable from the input dataset. The input and output datasets may then be displayed to a user on a computer display or stored on a computer readable storage media, or otherwise examined further. The output dataset may then be used to make adjustments to the energy load system and to take action to further dictate the operating behavior of the energy load system.

In a further monitoring operation, the reference data may be used to show how the energy load is operating currently by taking real-time measurements of the dependent variable (kilowatts) and comparing the real-time measurement to a modeled dependent variable (kilowatts) to evaluate any differences between the real and modeled readings.

For example, in FIG. 1, an energy monitoring system 100 is generally shown. The energy monitoring system 100 includes a load monitoring server 110, a plurality of intelligent electronic devices 120a-e (hereafter "IEDs"), a communications network 130, and a computer 140. The IEDs 120a-e are communicatively coupled through the communications network 130 to the load monitoring server 110 and the computer 140. Communications network 130 may be a wired or a wireless network. As used herein, an IED refers to any system element or apparatus with the ability to sample, collect, or measure one or more operational characteristics or parameters of an energy system. The energy system being monitored by the energy monitoring system 100 can be any of the five utilities designated by the acronym WAGES, or water, air, gas, electricity, or steam, or could be any other physical system, such as a production facility, a production line, an HVAC system, other industrial facilities, and the like. The energy monitoring system 100 may also monitor other energy consuming systems related to the WAGES utilities, the other industrial facilities, and the like. In the electrical utility context, the IEDs may be based on a PowerLogic® ION7550/7650 Power and Energy Meter available from Schneider Electric or any other suitable monitoring device (e.g., circuit monitor), circuit breaker, relay, metering device, or power meter, or the like.

The energy monitoring system 100 can be configured to monitor one or more of a plurality of characteristics or parameters of any of the WAGES utilities or other physical systems. For an electrical utility, the energy monitoring system 100 may be configured to monitor electrical characteristics such as, for example, power, voltage, current, current distortion, voltage distortion, and/or energy. For other utilities, the energy monitoring system 100 can be configured to monitor volumetric flow rates, mass flow rates, volumetric flux, mass flux, and the like.

For simplicity, the following disclosure will describe the invention in reference to a energy monitoring system 100 configured to monitor power (in watts or kilowatts, for example), although it is understood that all of the following embodiments and aspects can similarly be applied to monitoring any other electrical characteristic, or any other characteristic of any of the WAGES utilities or any other physical system, such as a production facility, a production line, a manufacturing facility, a factory, an HVAC system, other industrial facilities, and the like. Each of the IEDs 120a-e produce monitored characteristic values periodically at a monitoring interval, where the monitored characteristic values are indicative of the physical characteristic being monitored. Put another way, the IEDs 120a-e monitor power to produce a plurality of power measurements indicative of the electrical power being consumed.

As outlined above, WAGES utilities and other physical systems may be modeled mathematically by taking one or more observable qualities of the physical system that can be measured or observed (the driver variables), and using these driver variables to predict the numerical characterization of some other quality of the system (the modeled variable) which is thought to be causally influenced by the drivers.

The systems and methods of the present invention include mathematically modeling physical systems using linear regression models, which compute a predicted quantity as a linear combination of scaled input quantities. Linear regression models in accordance with the present invention also include those models which compute a nonlinear transform of the predicted quantity as a linear combination of one or more scaled input quantities, any of which may also have been previously nonlinearly transformed. Common transformations used on input and modeled quantities include, but are not limited to logarithm, exponential, square, square root, and higher order polynomials. For example, independent variable values may be scaled such that the modeled relationship between the independent and dependent variables is linear. Additionally, the same scaling used to create the model may be applied to independent variable values when using the model to generate predicted dependent variable values.

Linear regression models in accordance with the present invention may be created empirically, by looking at a dataset (the reference dataset) that captures both the driver and modeled variables for some time period (the reference period) and then inferring the relationship that best estimates the modeled variable from the driver variables in that dataset. Linear regression models in accordance with the present invention also include those which compute a nonlinear transform of the predicted quantity as a linear combination of one or more scaled input quantities, any of which may also have been previously nonlinearly transformed. For example, transformations used on input and modeled quantities include but are not limited to logarithm, exponential, square, square root, and higher order polynomials.

As an example shown in FIG. 1, power monitoring system 100 includes load monitoring server 110 and a group of attached sensors or other data entry means, including IEDs 120a-e. The system 100 of FIG. 1 may be used to predict the total electrical energy consumption in a particular industrial building in a day. So in the example of FIG. 1, the modeled variable is total daily energy consumption. To create the model, data must be supplied which capture the actual energy consumption during some period of observation in the past. Data must also be provided that characterize the physical influences on the building's energy consumption during the same time. These data are called driver data. Data of both kinds are provided via sensors or other data entry means, such as IEDs 120a-e.

Figure 2:
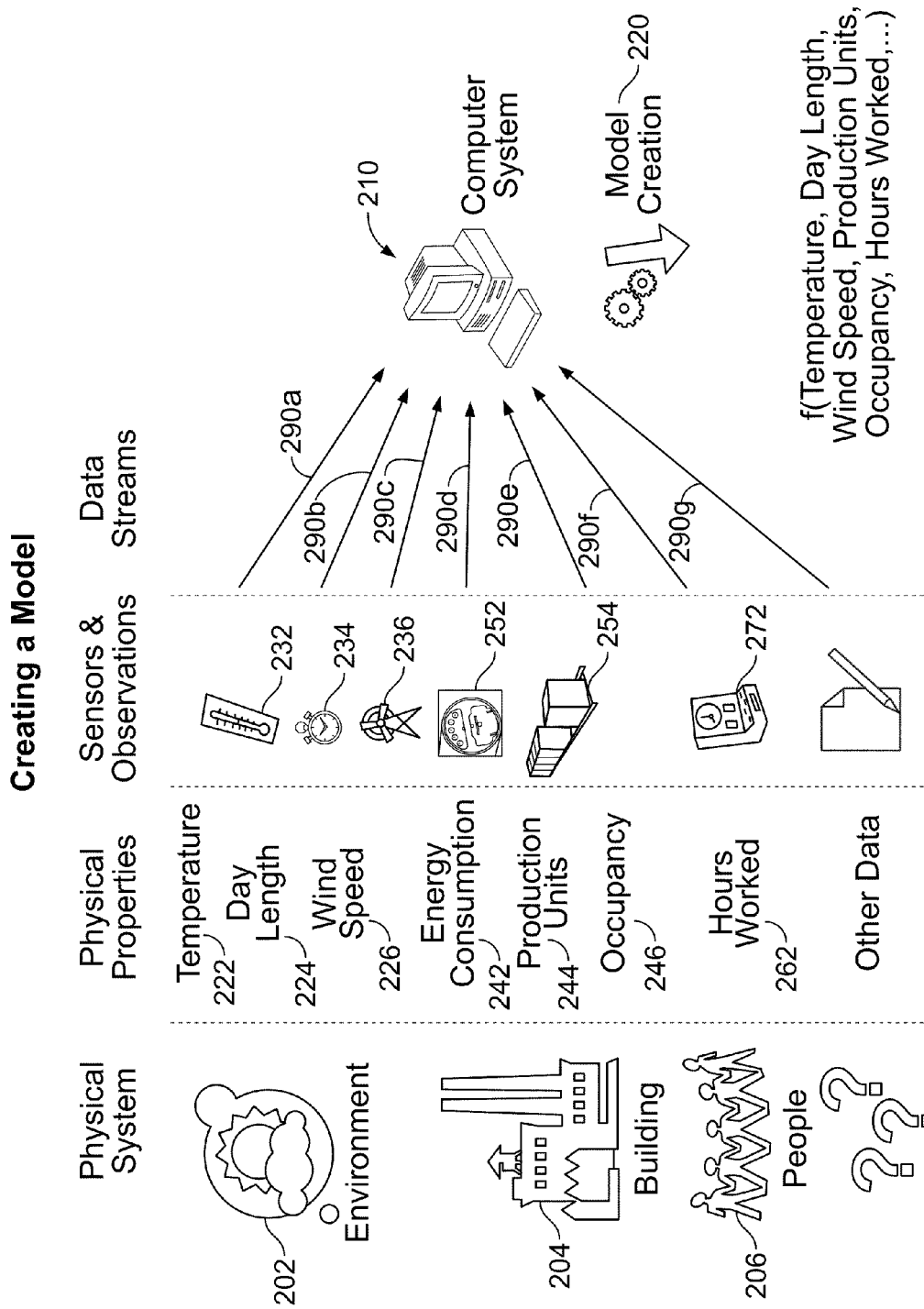
FIG. 2 is a graphical representation of a creation of an energy model in accordance with the present invention showing physical systems with observed physical properties as data stream inputs to a monitoring and modeling server.

FIG. 2 expands the example of FIG. 1 to show that any physical system, including environment 202, building 204, and people 206 systems possess physical properties 222, 224, 226, 242, 244, 246, 262 that may be observed and measured using sensors and other observational tools 232, 234, 236, 252, 254, 272. Streams of time-stamped data 290a-g indicate the outdoor weather temperature 222, length of day 224, wind speed 226, building occupancy 246, hours worked 262 by people inside the building, and a measure of business activity (such as the production units 244 of widgets manufactured, for example). The computer system server 210 analyzes the time-stamped data 290a-g (reference data) for a reference time period to determine an optimal formula to model the relationship between the driver variables 222, 224, 226, 244, 246, 262 and the modeled variable (daily energy consumption 242, for example). Once this model 220 has been created, a prediction for energy consumption on any day can be made by supplying values for the driver variables for that day. That is, energy consumption 242 is a function of the driver variables 222, 224, 226, 244, 246, 262.

Figure 3:
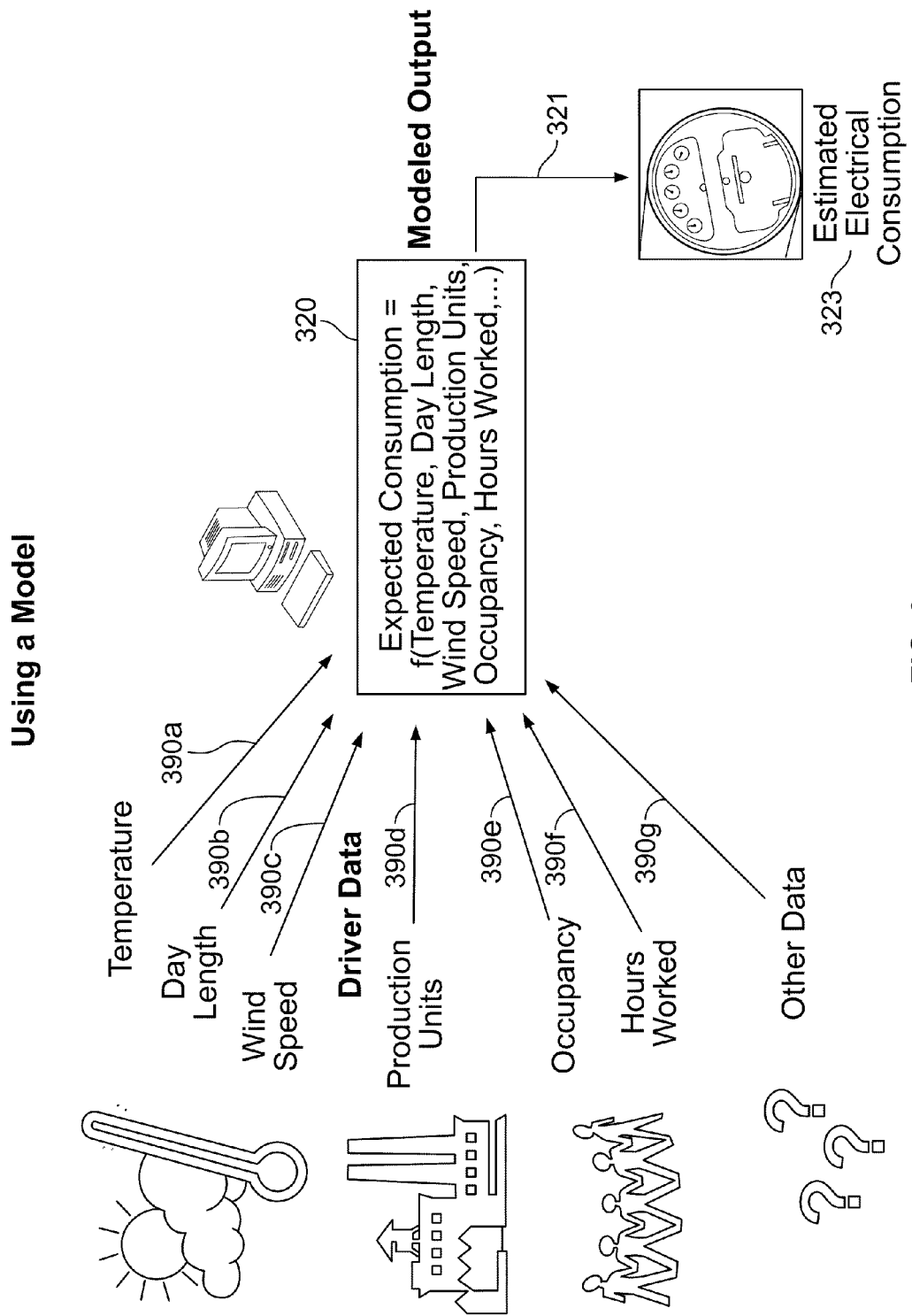
FIG. 3 is a graphical representation of a model in accordance with the present invention used to predict estimated electrical consumption based upon a variety of driver data.

As shown in FIG. 3, the model 320 is then used by supplying driver variable data 390a-g for other time periods to generate a modeled output 321 that is an estimate 323 of what the modeled variable (electrical consumption) should be if the system 100 were still behaving as it did during the reference period.

The reference period may be any period or duration of time where the independent variables and the dependent variables are sampled. The monitoring interval may be any period or duration of time between producing the monitored characteristic values. For example, the monitoring interval can be one minute, one second, one tenth of a second, etc. For a monitoring interval of one second, the IEDs 120a-e in FIG. 1 produce a monitored characteristic value (e.g., derived from a power measurement) every second. An TED monitoring power every second may produce a periodic sequence of monitored characteristic values as follows: [99.7 kilowatts, 99.8 kilowatts, 100.2 kilowatts, 100.1 kilowatts, 125 kilowatts]. Each of these power measurements corresponds to a monitored characteristic value produced periodically at consecutive one second intervals.

A non-limiting example of how the IEDs 120a-e can be used in practice provides that each of the IEDs 120a-e is a power monitor that monitors different aspects of an electrical utility in a building. The first IED 120a monitors an incoming electrical service to the entire building. The second, third, and fourth IEDs 120b-d monitor different circuits of a common voltage bus within the building. The fifth IED 120e monitors a critical electrical circuit for servers in a server room within the building. Each of the IEDs 120a-e monitors power draw and produces power measurements, that is, monitored characteristic values, periodically at the monitoring interval.

According to some embodiments of the present invention, the monitored power values (characteristic values) and/or any associated information stored in the memory of the first IED 120a are transmitted over the network 130 to the load monitoring server 110 for storage and/or processing. According to some embodiments, the monitored characteristic values and/or associated information stored in the memory of the IEDs 120a-e are transmitted over the network 130 at predetermined intervals. For example, the monitored characteristic values and associated information can be transmitted every hour, every twelve hours, every day, every week, or every month. Other transmission schedules with more or less frequency are contemplated depending on the amount of memory in the IEDs 120a-e and the duration of the first logging interval.

A user 145 of the computer 140 (such as a workstation) can view the monitored power values on a display. The user 145 may also view any associated information stored on the server 110. Optionally, the user 145 can connect a workstation computer 140 through the network 130 directly to one or more of the IEDs 120a-e to view and/or download the monitored characteristic values and/or associated information stored on the IEDs 120a-e on a video display.

Figure 4:
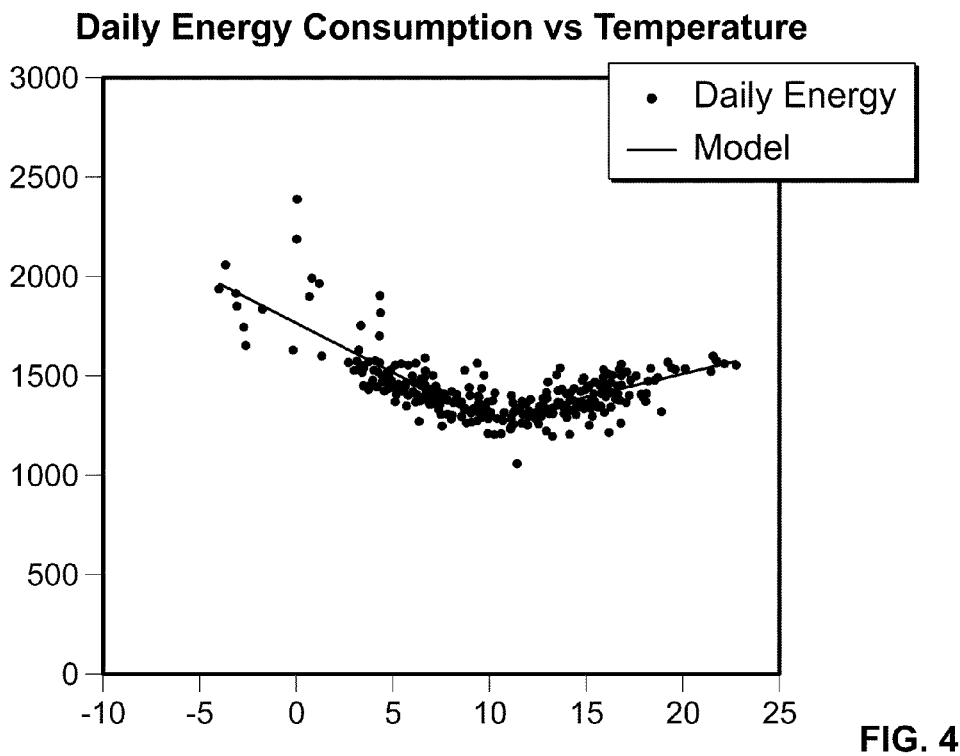
FIG. 4 illustrates an example of a single driver model showing a nonlinear relationship approximated by a piecewise linear model.

While conventional linear regression models may be acceptable for systems that respond in a linear way to their surroundings, for systems that exhibit nonlinearity in the relationships between the driver data and the modeled variable, piecewise linear models provide a simplified approach to approximating nonlinear models. FIG. 4 illustrates an example of a single driver model for energy consumption in a building as a function of average daily outdoor temperature showing a nonlinear relationship being approximated by a piecewise linear model.

Figure 5:
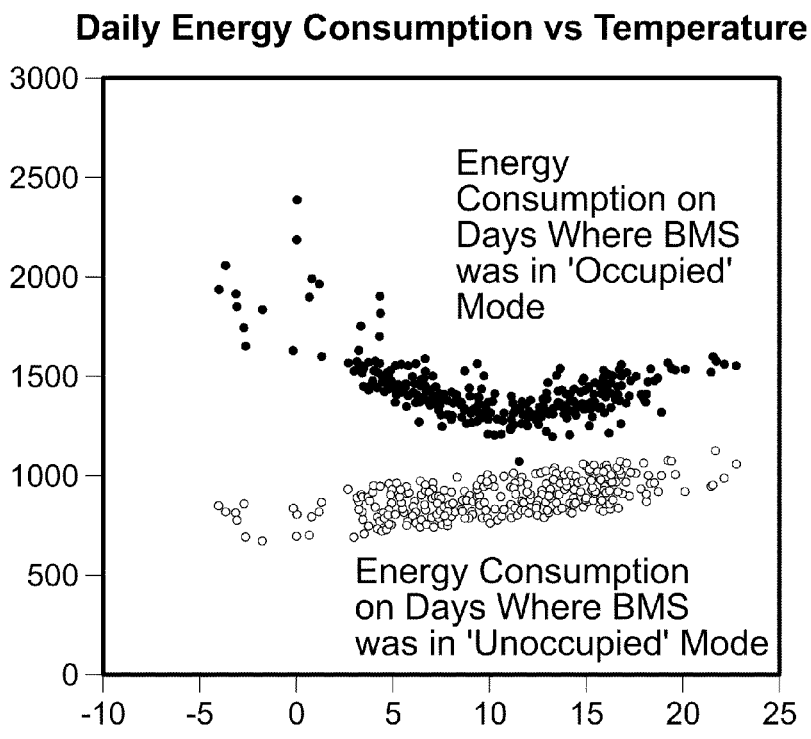
FIG. 5 illustrates an example of building energy consumption for a bimodal physical system.

Some physical systems may have regimes of linear or piecewise linear behaviour, each of which can be modeled well, but for which no single model will work for all of the regimes of applicability. One example of such a physical system is the energy consumption of a building whose heating and air conditioning system is under the control of an automated building management system (BMS). Building management systems may be "modal" in the sense that they have two or more operating modes corresponding to anticipated activity in the building. For example, the BMS may have "occupied" and "unoccupied" air conditioning and heating programs, each of which uses a different algorithm or process to control building air handling equipment. While energy consumption could be modeled well using a linear or piecewise linear model driven by outdoor temperature, occupancy, and business activity for each mode separately, prior to the system and method of the present invention, no single model could be constructed that works for both occupied and unoccupied modes. FIG. 5 shows an example of building energy consumption data for such a bimodal system.

If each mode can separately be described accurately using a linear model, two models may be created, and a user can switch between the two models as needed. In this situation, during model creation, background data is divided into batches according to the time periods in which the physical system is presumed to be in each of the modes, and a model is constructed for each. A user may partition all system data into weekday and weekend times, and then construct two linear regression models, one for the weekday data and one for the weekend data. When using the models to make estimates of energy consumption, the weekday model would be used to predict weekday consumption, and the weekend model would be used to predict weekend consumption.

In this example, the division of data into groups based upon the time of the data recording would act as a "best guess" proxy for the operating mode of the system being modeled. As long as the operating modes of the building management system changed on the same time boundaries as the weekend/ weekday choices that differentiate the model, the intent of having one model per mode would be satisfied.

Such time-based partitioning of data and model generation can be characterized as building a set of models, one for each value of a nominal discrete variable that is a function of time. In the example above, the ordinal discrete variable could be called "Workweek" and contain one of two values, that is "Weekday" and "Weekend." The data in the background dataset used to create a model can be assigned a value of this "partition variable" to categorize it into weekday and weekend data.

The difficulty with this approach is that real-world systems may not change their modes on rigidly predictable time schedules. Continuing with the example of a building management system, buildings may be unoccupied during weekdays for holidays, and may be occupied on weekends during special events, or when occupants are working overtime. An alert building manager would program exceptions in the schedule of the BMS to put the system in "unoccupied" mode for weekday holidays, and in "occupied" mode for worked weekends. For example, a building occupant working on a weekend day may hit an "override" button to switch initiate heating or cooling while the occupant worked in the building on the weekend. Or, the choice of modes may be controlled based on a complex automated set of decision-making criteria. A linear modeling system that relied exclusively on a set, time-dependent schedule for partitioning data during creation, and for switching between models when generating output, would use the wrong model for these exceptional cases. Additionally, the system and method of the present invention may use more than one partition variable in the creation of models. In the same way that a model is created for each discrete value of a single partition variable, a model may be created for each discrete value of each partition variable. As in the above example, if there are two partition variables labelled "Occupancy" and "HVAC Mode," the values for Occupancy may be "occupied" and "unoccupied" while the values for HVAC Mode may be "normal" and "maintenance." A model may be created for each possible combination of these partition variables for four models in total.

Systems and methods of the present invention replace the ordinal discrete variable computed as a function of time with a partition variable that is either delivered by, or computed from, an external data stream. The system and method of the present invention may be further illustrated using the previous example of modeling the energy consumption in an industrial building based on outdoor temperature, where the building HVAC system has two distinct operating modes, namely "Occupied" and "Unoccupied." The building management system may be computer controlled and can make available the operating mode at any given time as a stream of discrete values encoded in an integer. The discrete values corresponding to the operating mode may be reported at five minute intervals, for example. If zero represents "Unoccupied" and one represents "Occupied," a time-stamped stream of building mode data may be used directly as a partition data stream.

Figure 6:
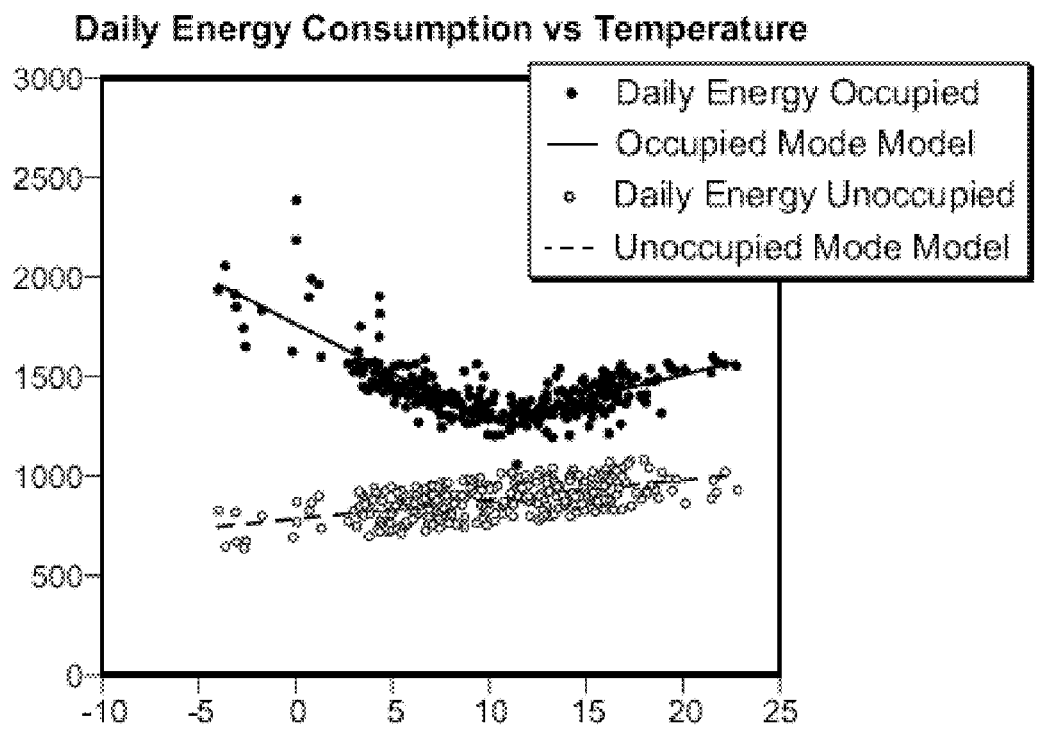
FIG. 6 illustrates a model for predicting building energy consumption for a bimodal physical system in accordance with the present invention.

As shown in the graph of FIG. 6 and the accompanying flow chart of FIG. 7, to create a model using this stream data, reference data would be divided into two subsets of data, depending on the value of the "Building Mode" variable at the time of each sample. One model would be created for data in the 'Unoccupied' group and another for the "Occupied" group.

To make a prediction with the model, a driver data point would have its timestamp compared to the value of the "Building Mode" variable at the same time (coincident) to find the value of the building mode, which would then be used to select the model into which the driver data would be inserted in order to predict the energy consumption at that time.

Figure 7A:
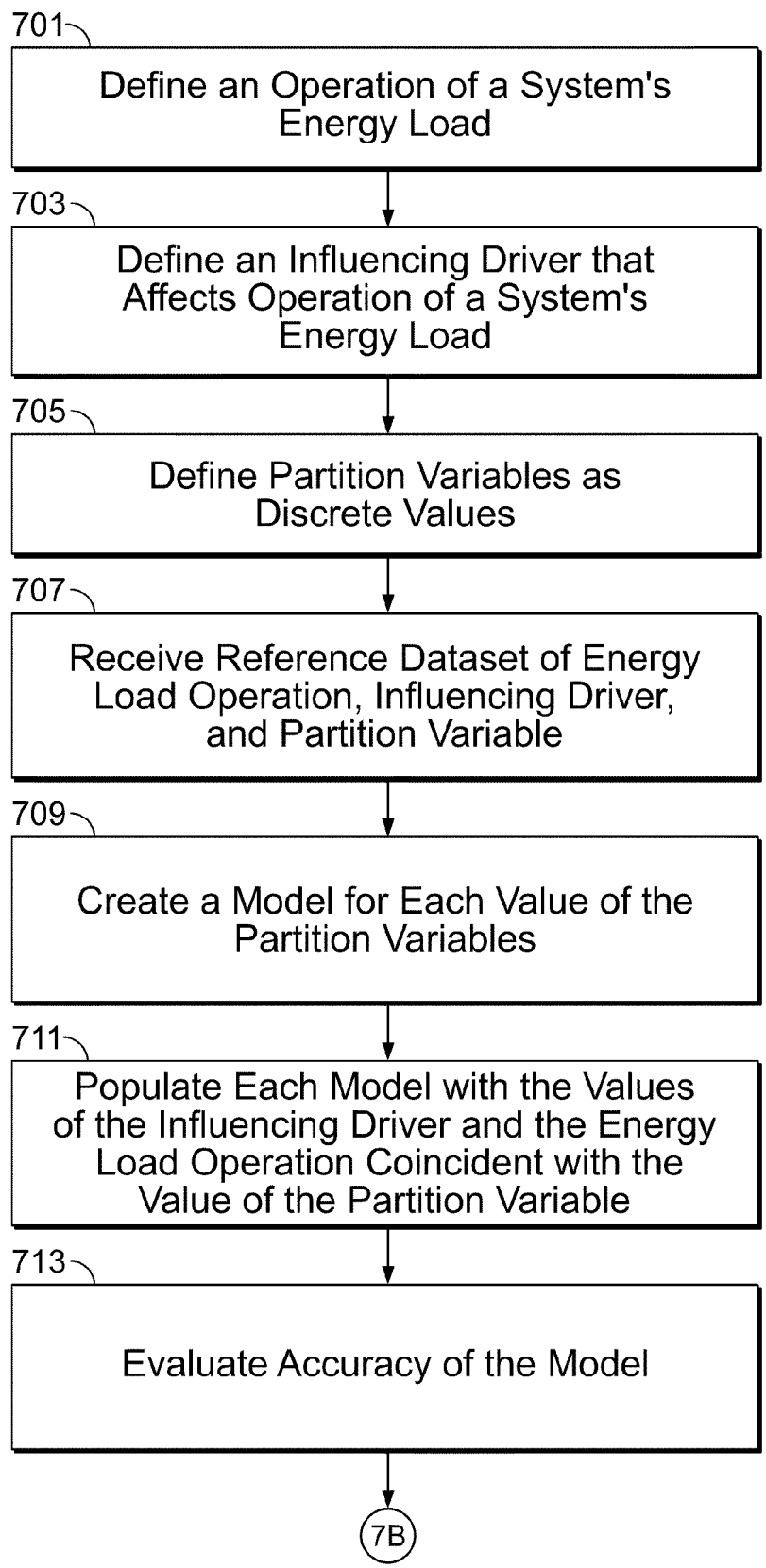
FIGS. 7A and 7B are flow diagrams illustrating a method of modeling and monitoring an energy load in accordance with the present invention.
Figure 7B:
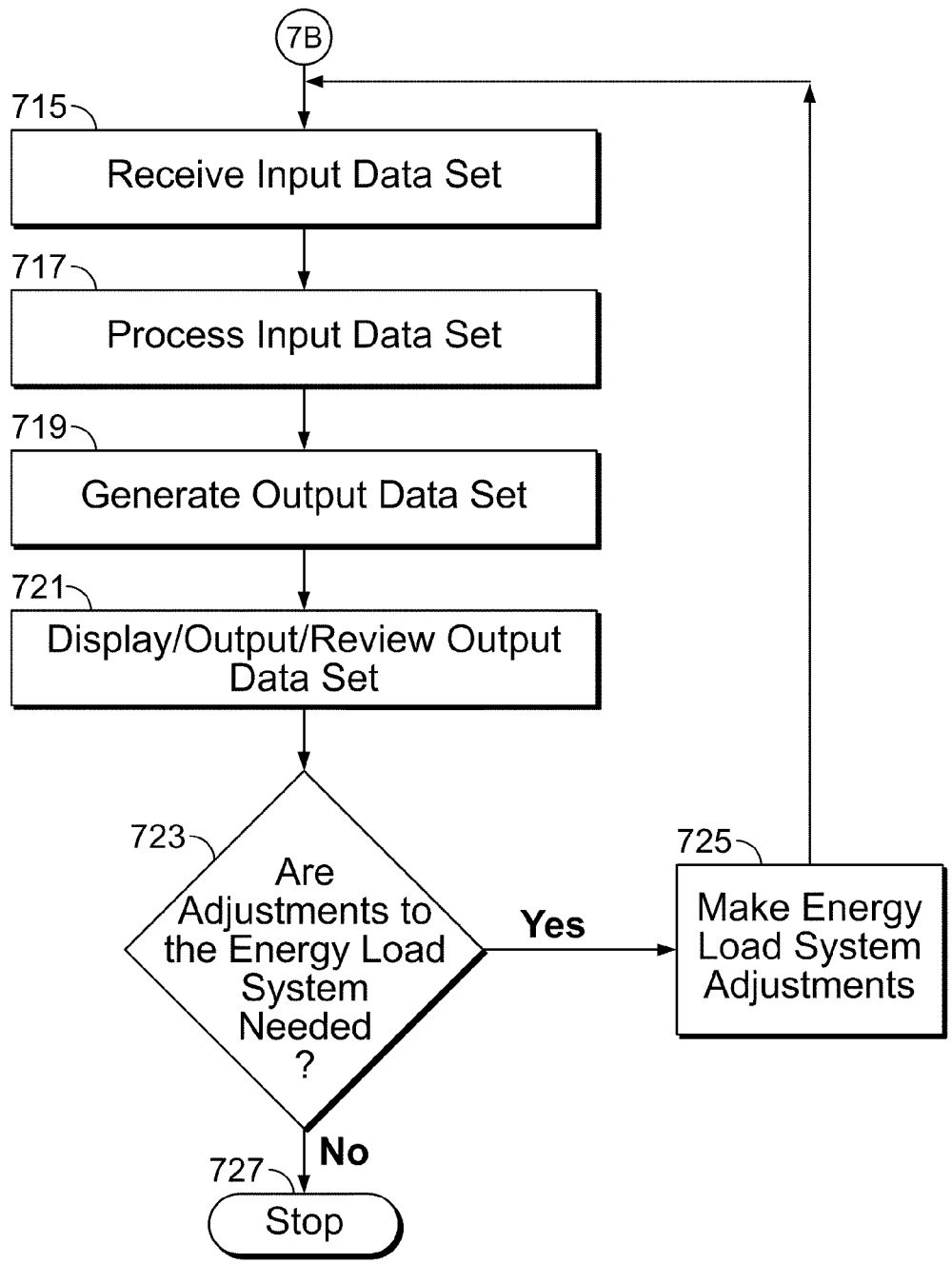

FIGS. 7A and 7B provide a process flow for employing a computer-implemented method of modeling and monitoring an energy load in accordance with the present invention. In step 701, a load monitoring server is used to define a dependent variable representative of the operation of an energy load. The operation of the energy load may be a dependent variable, such as "kilowatts" in the HVAC system example.

In step 703, the load monitoring server defines one or more independent variables which are representative of one or more influencing drivers of the operation of an energy load. The influencing drivers are akin to independent variables that affect system operation of the HVAC system, in the example above. In one system, the influencing driver may be outdoor temperature, for example. The outdoor temperature affects system operation of the HVAC system in the building example. The monitoring and modeling system may then be used to determine the specific effect that outdoor temperature has on the number of kilowatts used in the HVAC system.

In step 705, the modeling and monitoring method uses the load monitoring server to define one or more partition variables that represent operating conditions of the energy load as discrete values. Continuing with the HVAC system example, the partition variable may be defined as comprising discrete values such as "Occupied" and "Unoccupied."

Once the variables are defined, in step 707 the computer-implemented method for modeling and monitoring an energy load receives a reference dataset at the load monitoring server. The reference dataset includes coincident values of the operation of the energy load (dependent variable), the influencing driver (independent variable), and the partition variable. In the HVAC system example, the reference dataset includes values of the kilowatts used, the outdoor temperature, and the occupancy status of the building at a number of times during a day.

In step 709, the modeling and monitoring system and method then creates a model for each discrete value of the partition variable in the reference dataset with the load monitoring server. The models represent operation of the energy load of the system.

After the models are created for each discrete value of the partition variable, in step 711 each model is populated with the values of the independent variable (outdoor temperature) and the dependent variable (kilowatts) coincident with the discrete value of the partition variable (occupied or unoccupied) corresponding to the created model, such that the dependent variable is modeled as a function of the independent variable.

When the models are created and the variables are mapped, in step 713 the modeling and monitoring system may evaluate the accuracy of the model by plugging in a new set of input data. Input data may be received at the load monitoring server in step 715. The input data set may include additional coincident values of the independent variable (outdoor temperature) and the partition variable (occupied or unoccupied). In step 717, the system of the present invention may then process the additional coincident values of the independent variable (outdoor temperature) and the partition variable (occupied or unoccupied) with the created models and generate an output dataset with the load monitoring server from the created models in step 719. The output dataset includes coincident values of the predicted dependent variable (kilowatts). The output dataset may also include coincident values of the independent variable (outdoor temperature) and the partition variable from the input dataset. In step 721, the output dataset may then be displayed to a user on a computer display or stored on a computer readable storage media, or otherwise examined further.

The output dataset may then be used as the basis to make adjustments to the energy load system and to take action to further dictate the operating behavior of the energy load system. For example, in step 723, the user or the system of the present invention may determine whether adjustments to the energy load system are needed. If adjustments are needed, the energy load adjustments may be made in step 725, and the process may return to step 715 and another input data set may be processed. If, however, in step 723 the determination is made that no energy load adjustments are necessary, the process stops at step 727.

Additionally, in a monitoring operation, the reference data may be used to show how the energy load is operating currently by taking real-time measurements of the dependent variable (kilowatts) and comparing the real-time measurement to a modeled dependent variable (kilowatts) to evaluate any differences between the real and modeled readings. Adjustments may then be made to the system to address any issues that may exist regarding the operating behavior of the energy load system. Adjustments may include re-programming computer control of systems, such as the HVAC system. Likewise, differences between the real and modeled readings may be indicative of component failures in the system, and repair or replacement of the failed components may be performed to correct system performance, which would subsequently bring the real and modeled readings into agreement.

The present invention may create a partition variable from a discrete data stream from an external instrument, measurement, or observation of some qualitative physical property that is characterized by discrete categories as above. Additionally, the system and method of the present invention may create a partition variable using a continuous quantity from an external instrument, measurement, observation, and the like that categorizes the external data. The range of the function may be a finite set of discrete categories, which become the partition domain of the partition variable.

For example, consider the same modeling scenario, but where the operational mode of the building management system is not available directly as a data stream. One example may be when the building management system (BMS) selects among distinct operating modes but bases the selection on sensors that detect building occupancy directly instead of being programmed to use different operating modes at different times. That is, the monitored characteristic value of the number of people in the building is indicative of the occupancy of the building. The building security system provides data on building occupancy as a number of building occupants at any given time. This information is made available to the modeling and monitoring computer system of the present invention during the reference period and at all other times when driver data is available. A partition variable may then be created that has two values as before, occupied and unoccupied, but its value is determined using a function of the building occupancy head-count. For example, if the number of regular occupants in a building were 500, the partition variable could be defined as "Occupied" whenever the head-count exceeds 250. If the head-count were below 250, the partition variable would be defined as "Unoccupied." The head-count continuous input data is acted upon by a partition function to produce the discrete partition data, which would go on to be used in model creation and evaluation as in the preceding example above.

As can be seen from this example, the partition data may be a number of discrete values. Extending the head-count example further, the HVAC system may be set up for multiple occupancy values. For example, referring back to FIG. 1, IED 120a may monitor an occupancy characteristic of a particular floor. The HVAC system that directs heating, ventilation, and air conditioning to that floor may then switch to an "occupied" mode when the occupancy count for that particular floor reaches a threshold value.

Figure 8:
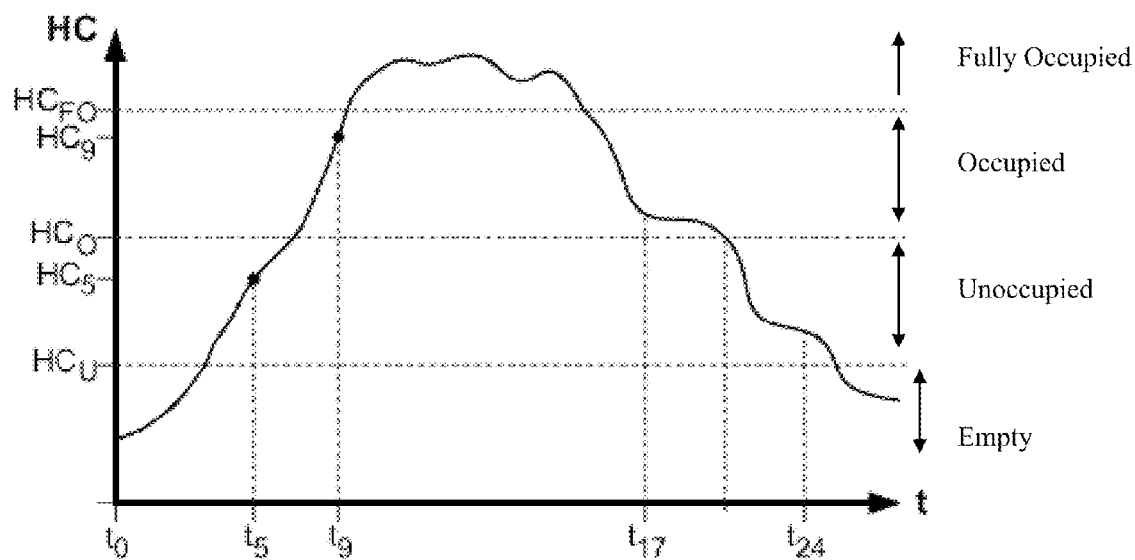
FIG. 8 is a graphical representation of an example of a monitored characteristic and partition data shown as a number of discrete values.

Likewise, as shown in FIG. 8, the monitored characteristic value is the number of people in the building given by head count, HC. The partition data may be a number of discrete values, $HC_u$, $HC_o$, $HC_{fo}$. These discrete values may indicate threshold levels of occupancy of the building. For example, at head count levels below $HC_u$, the building is deemed "empty." For head count levels above $HC_u$, but below $HC_o$, the building is deemed to be "unoccupied." For head count levels above $HC_o$, but below $HC_{fo}$, the building is deemed to be "occupied," and for head count levels above $HC_{fo}$, the building is deemed to be "fully occupied." In this fashion, four discrete values (empty, unoccupied, occupied, and fully occupied) are used as the partition values.

The stored monitored characteristic values for head count between time $t_0$ and time $t_{24}$ are logged periodically. When the monitored characteristic value for head count exceeds a threshold value $HC_u$, $HC_o$, $HC_{fo}$, or drops below a threshold value $HC_u$, $HC_o$, $HC_{fo}$, the partition value for that time period will also change. For example, at time $t_5$, the head count value is $HC_5$. $HC_5$ is between $HC_u$ and $HC_o$, thereby indicating a partition value of "unoccupied." At time $t_9$, the head count value is $HC_9$. $HC_9$ is between $HC_o$ and $HC_{fo}$, thereby indicating a partition value of "occupied." Additional monitored characteristics may also be logged, and the logging interval may be continuous.

The threshold values may be used as trigger criteria for the system or the operator to take further action, such as increasing or decreasing a set point of the HVAC system. In the example of FIG. 8, when the building is empty, the air conditioning level may be set to 80 degrees Fahrenheit. When the building is unoccupied, the air conditioning level may be set to 78 degrees, and when the building is occupied, the level may be set to 74 degrees. Likewise, the threshold values can be set depending on the application of the particular IED being used in the energy monitoring system 100.

Any of the methods described herein can include machine readable instructions for execution by: (a) a processor, (b) a controller, and/or (c) any other suitable processing device. It will be readily understood that the IEDs 120a-e, the server 110, and/or the computer 140 can include such a suitable processing device. Any algorithm, software, or method disclosed herein can be embodied in software stored on a tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine readable instructions represented in any flowchart depicted herein may be implemented manually. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

Though through the preceding discussion the examples have discussed modeling energy consumption of an industrial building as a function of environmental influences and human occupancy, there is nothing in the invention to restrict its use to such applications. Any modeled variable which can be predicted to desired accuracy as a linear or piecewise linear function of some number of driver variables, which displays modality in the functional relationship would be equally suitable.

While particular aspects, embodiments, and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A computer-implemented method of modeling and monitoring an energy load, the method comprising:
   defining a dependent variable with a load monitoring server, the dependent variable representing an operation of the energy load;
   defining at least one independent variable with the load monitoring server, the at least one independent variable representing at least one influencing driver of the operation of the energy load;

defining at least one partition variable with the load monitoring server, the at least one partition variable representing an operating condition of the energy load as a set of two or more discrete values;

receiving a reference dataset at the load monitoring server, the reference dataset including coincident values of the dependent variable, at least one independent variable, and at least one partition variable;

analyzing the reference dataset with the load monitoring server to arrange the reference dataset into interdependent data based upon the discrete values of the at least one partition variable;

creating a model for each discrete value of the at least one partition variable in the analyzed reference dataset with the load monitoring server in which the dependent variable is modeled as a function of the at least one independent variable, the model representing operation of the energy load;

receiving an input dataset at the load monitoring server, the input dataset including additional coincident values of the at least one independent variable and the at least one partition variable;

processing the additional coincident values of the at least one independent variable and the at least one partition variable with the created models; and generating an output dataset with the load monitoring server from the created models, the output dataset including predicted dependent variable values from the at least one independent variable and the at least one partition variable from the input dataset.

2. The method of claim 1, wherein each created model is developed using a linear regression method.

3. The method of claim 2, wherein the linear regression method is a piece-wise linear regression method.

4. The method of claim 2, wherein the linear regression method computes a nonlinear transform of a predicted quantity as a linear combination of at least one scaled input quantity.

5. The method of claim 1, wherein the partition variables include a set of discrete values derived from a range of continuous values.

6. The method of claim 1, wherein the coincident values in the reference dataset are measurements taken in the past.

7. The method of claim 6, wherein the measurements are performed with an external instrument.

8. The method of claim 1, wherein the coincident values in the reference dataset are hypothetical measurements.

9. The method of claim 1, wherein the additional coincident values in the input dataset are hypothetical measurements.

10. The method of claim 1, wherein the coincident values of the dependent variable are measurements of a utility service quantity.

11. The method of claim 10, wherein the measurements of a utility service quantity are an electrical utility service and include at least one of current, voltage, power, and energy.

12. The method of claim 10, wherein the utility service is a gas utility service, a water utility service, an air utility service, or a steam utility service.

13. The method of claim 1, wherein the coincident values of the independent variable is at least one measurement of temperature or production volume.

14. The method of claim 1, wherein the coincident values of the partition variables include at least one of building occupancy, building management system mode, and type of manufactured product.

15. The method of claim 1, wherein the influencing drivers include at least one of the physical properties of outdoor temperature, barometric pressure, humidity, cloud cover characteristics, length of day, building occupancy, production units, and man-hours worked.

16. The method of claim 1, wherein the reference dataset is provided to the load monitoring server by an intelligent electronic device (IED).

17. A system for modeling and monitoring an energy load, the system comprising:

a load monitoring server configured to:

define a dependent variable, the dependent variable representing an operation of the energy load;

define at least one independent variable, the at least one independent variable representing at least one influencing driver of the operation of the energy load;

define at least one partition variable, the at least one partition variable representing an operating condition of the energy load as a set of two or more discrete values;

receive a reference dataset, the reference dataset including coincident values of the dependent variable, at least one independent variable, and at least one partition variable;

analyze the reference dataset to arrange the reference dataset into interdependent data based upon the discrete values of the at least one partition variable;

create a model for each discrete value of the at least one partition variable in the analyzed reference dataset in which the dependent variable is modeled as a function of the at least one independent variable, the model representing operation of the energy load;

receive an input dataset, the input dataset including additional coincident values of the at least one independent variable and the at least one partition variable;

process the additional coincident values of the at least one independent variable and the at least one partition variable with the created models; and generate an output dataset from the created models, the output dataset including predicted dependent variable values from the at least one independent variable and the at least one partition variable from the input dataset.

18. The system of claim 17 further comprising:

an intelligent electronic device (IED) communicatively coupled to the load monitoring server via a communications network, the IED storing monitored characteristic values of the reference data set.

19. The system of claim 18, wherein the stored monitored characteristic values of the reference data set include the coincident values of the dependent variable, independent variable, and partition variables.

20. A non-transitory computer-readable storage media for modeling and monitoring an energy load, the computer-readable storage media comprising one or more computer-readable instructions configured to cause one or more computer processors to execute the operations comprising:

defining a dependent variable with a load monitoring server, the dependent variable representing an operation of the energy load;

defining at least one independent variable with the load monitoring server, the at least one independent variable representing at least one influencing driver of the operation of the energy load;

defining at least one partition variable with the load monitoring server, the at least one partition variable representing an operating condition of the energy load as a set of two or more discrete values;

receiving a reference dataset at the load monitoring server, the reference dataset including coincident values of the dependent variable, at least one independent variable, and at least one partition variable;

analyzing the reference dataset with the load monitoring server to arrange the reference dataset into interdependent data based upon the discrete values of the at least one partition variable;

creating a model for each discrete value of the at least one partition variable in the analyzed reference dataset with the load monitoring server in which the dependent variable is modeled as a function of the at least one independent variable, the model representing operation of the energy load;

receiving an input dataset at the load monitoring server, the input dataset including additional coincident values of the independent variable and the partition variable;

processing the additional coincident values of the at least one independent variable and the at least one partition variable with the created models; and generating an output dataset with the load monitoring server from the created models, the output dataset including predicted dependent variable values from the at least one independent variable and the at least one partition variable from the input dataset.

* * * * *